Sept. 7, 1937.  H. M. HOBART  2,092,647
GLASS INSULATED UNDERGROUND ELECTRIC CABLE
Filed Aug. 24, 1935
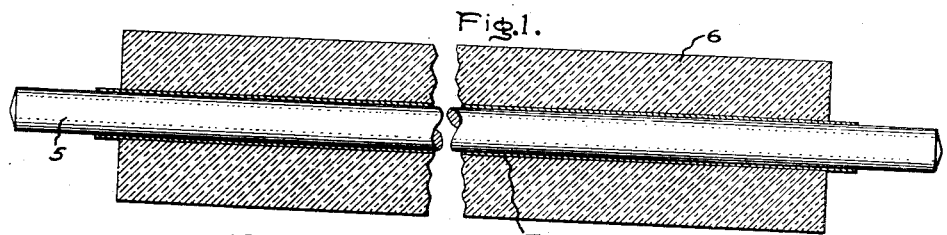
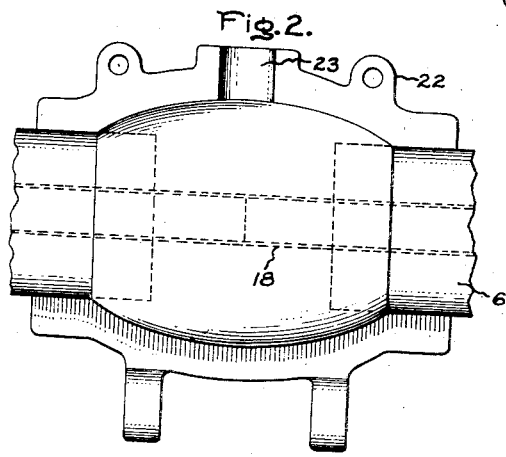
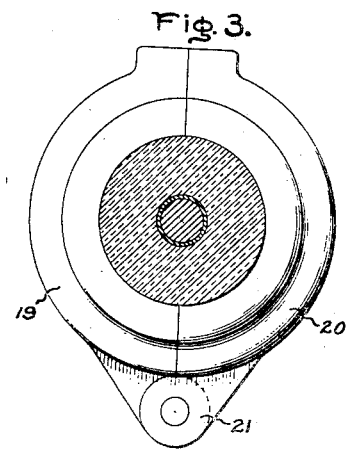
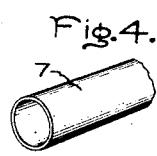
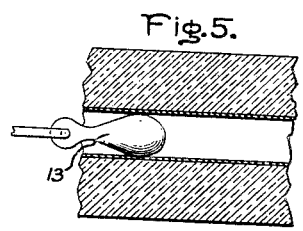
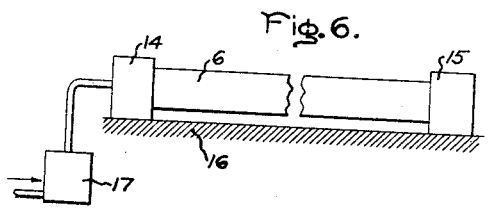
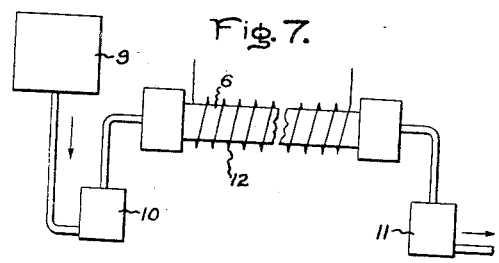
Inventor:
Henry M. Hobart,
by Harry E. Dunham
His Attorney.

Patented Sept. 7, 1937

2,092,647

UNITED STATES PATENT OFFICE 2,092,647

GLASS INSULATED UNDERGROUND ELECTRIC CABLE

Henry M. Hobart, Niskayuna, N. Y., assignor to General Electric Company, a corporation of New York Application August 24, 1935, Serial No. 37,702

3 Claims. (Cl. 173—264)

The present invention relates to electric cable for transmitting high voltage electric current underground which, as an example but not as a limitation, may be of the order of 100,000 volts and upwards. It relates more specifically to constant current variable voltage cable systems where the heating is a more constant factor than in constant voltage variable current systems.

At the present time, the accepted type of cable for transmitting electric current underground comprises a stranded conductor, an insulating covering therefor made of a great many layers of impregnated paper or fabric and a sheath made of lead. Such a cable is relatively expensive and requires in its manufacture a high degree of skill and care as well as expensive machinery. The insulating material itself is a substantial item of the total cost. The sheath which is made of lead has to be extruded over the insulated conductor by large and expensive presses, and the temperature of the lead has to be accurately controlled to afford satisfactory results. Unless great care is taken, imperfections will appear in the sheath such as oxides, improperly formed seams and small blow holes. If these imperfections are appreciable, it is necessary to strip the sheath from the cable and re-lead it which represents a substantial increase in the cost of manufacture because there is no entirely satisfactory repair method or means.

The object of my invention is the provision of an improved cable for underground transmission of electricity which is less costly than the types of cable now in use for the purpose.

For a consideration of what I believe to be novel and my invention, attention is directed to the accompanying description and to the claims appended thereto.

In the accompanying drawing, which is illustrative of my invention, Fig. 1 is a longitudinal section of a length of cable; Figs. 2 and 3 illustrate a mold used in jointing lengths of cable; Fig. 4 is a perspective view of a metallic lining for the glass enclosure of the conductor; Fig. 5 illustrates a mechanical means for expanding the lining; Fig. 6 illustrates an hydraulic means for the same purpose; Fig. 7 illustrates a means for forming the lining between the conductor and the glass enclosure; and Fig. 8 indicates a non-corrosive grounding tape for the exterior of the glass enclosure.

As my improved cable is intended especially for direct current transmission as distinguished from alternating current, a non-stranded or unitary conductor 5 is or may be employed. It may be in the form of a solid rod of copper or it may be in the form of a tube. In both cases, the metal should be sufficient in cross-section to carry the current without undue heating and without undue $I^2R$ loss in the line. Since the conductor is not flexible in the sense that a stranded conductor is flexible, it cannot be wound on a reel according to standard cable practice. For that reason, the cable is made in relatively short lengths or pieces. Their length will be determined by two principal factors, first by factory conditions, and second by the limitations imposed in shipping and handling. In general, lengths of the order of 100 feet will be satisfactory as they can be bundled and shipped on flat cars. It is desirable to make them as long as possible so as to decrease the number of joints which have to be made in the field for the complete cable or section.

Instead of using impregnated paper or fabric as the insulating material and a sheath, glass in the form of heavy wall self-supporting tubing 6 is employed which serves as the insulating material and also as the sole support for the conductor. Each tube is substantially of the same length as the conductor. The conductor should, however, project a short distance beyond the tube at each end and be suitably shaped to facilitate jointing. The glass employed may be of the cheaper grade used in the manufacture of articles such as bottles and other containers. More expensive glass may be used in special cases but ordinarily the cheaper grades will be satisfactory. Because glass is cheap, has high dielectric strength, and because it is desired to make a rigid construction capable of supporting itself and also the conductor, it is desirable to make the wall of the tube relatively thick, say for example of the order of one-half inch for a conductor having a diameter of three-eighths of an inch and designed to transmit constant current at a voltage of the order of 100,000. A tube having a thicker wall may be used if desired, especially where greater mechanical strength is required. Since some glass possesses better dielectric properties than others, it may be stated as a general proposition that apart from the question of mechanical strength, the better glass need not be so thick for a given voltage as the inferior grades. By preference, the glass should have as nearly as possible the same co-efficient of expansion as the conductor for the same change of temperature. In the event that there be an appreciable difference in expansion in some particular case, expansion joints may be provided at suitable intervals. Where the conductors are joined end to end, a certain amount of the expansion of the conductor can take place radially instead of longitudinally. This is permitted due to the fact that the bore of the glass enclosure is slightly larger than the conductor. If the conductor is a hollow tube, then the radial expansion or contraction with change of temperature is facilitated and the more so, the smaller the radial depth of the copper or other metal conductor. With cable intended for constant current, there will not be those sudden changes of temperature which occur with cables intended for constant potential and variable current.

The tubing may be formed in any suitable manner. For example, the glass may be extruded or made in tubular form in machines embodying the characteristics of the present day glass tube making machines or, in some cases, it may be extruded directly over the conductor. When the tubing is made separately, it may either be pushed over the conductor or the conductor pulled into it, whichever is the more convenient. However it is made, it is desirable to properly anneal the glass to free it of internal strains as fully as possible.

In the transmission of constant current, even at the high voltages mentioned herein, the corona effect is usually not very pronounced. However, if it does take place, the result will be injury to the glass. If the glass were fused or bonded to the conductors throughout their entire lengths so that no spaces or voids existed between the surface of the conductor and the wall of the glass tubing, corona would not take place. For the reason that it would be extremely difficult to insure such perfect bonding of the glass tubing to the metal, in such lengths as are here contemplated, it is desirable to introduce between the conductor and the wall of the tube a metal lining 7 which is of such character that it will make intimate contact with the wall of the glass tube despite any irregularities in the surface thereof. Due to the presence of the metallic lining, the conductor is slightly smaller in diameter than the bore of the tube. The lining may be made in any suitable way. As an example but not as a limitation of my invention, the lining may be made of lead or equivalent metal having a reasonably low melting point and which when hot is forced into the clearance space between the conductor and tube, as by the use of a force pump at one end of the lining or a vacuum pump at the other or by both force and vacuum pumps operating simultaneously, the glass in the meanwhile being kept at a fairly high temperature by electrical or other heating means to prevent chilling of the metal as it is introduced. In Fig. 7 is shown an arrangement suitable for this purpose wherein 9 indicates a melting pot for the lead or other metal, 10 a pump for forcing molten metal into the glass enclosure between the wall of its bore and the conductor, and 11 an exhaust or vacuum pump. To heat the tube an electrical heating unit 12 is employed which by way of example may take the form of a spirally wrapped resistance heating unit. Another suitable arrangement is to pull a thin wall tubular lining 7 of soft lead or equivalent metal into the glass tube, said lining being initially of a diameter slightly less than the bore of the glass tube and then expand the lining by internal pressure. The pressure may be exerted by pulling or pushing a tool 13 having the proper size and shape through the tube to expand the lining into firm contact with the glass, as illustrated in Fig. 5. Another alternative to accomplish this result is to subject the interior of the lead lining to hydraulic pressure which would force it outwardly into intimate contact at all points with the glass tube. In Fig. 6 is illustrated suitable means for the purpose. The length of glass tubing 6 with the lining therein is provided with end heads 14 and 15 which are properly sealed and packed to prevent escape of liquid and to confine it to the interior of the lining. The heads are suitably united to prevent them from being forced off of the ends of the tube, as by bolting them to a support 16. Liquid under pressure sufficient to expand the lining is admitted thereto from the force pump 17 which may be of any suitable construction. After the glass tubing has been lined in the manner described in last two mentioned ways, the conductor is pulled or pushed into place. With a suitable metal lining, the conductor need not make a tight fit therein which is advantageous in inserting the conductor initially or in making a repair if necessary. The conductor is in electrical contact with the lining throughout its length, and the latter being of metal also acts as a conductor.

Having completed the lengths of cable at the factory, they are transmitted in bundles to the place where they are to be installed. The first step is to dig suitable trenches where the cable is to be laid and then to lay the cable alongside of the trench, the conductors being in end to end relation. The ends of the conductors either before they are encased in glass or subsequently are properly shaped and the ends so treated are then united as for example by a welding or brazing operation into a unitary whole. In this particular, the usual practice of uniting metal parts may be followed. The fact that the insulation for the conductors is glass instead of oil impregnated paper or fabric, both of which readily burn, permits the fusing of the conductor ends readily to be accomplished under proper temperature conditions. Bearing in mind that the conductor is exposed at the joints between adjacent glass tubes or coverings, the next step is to cover the exposed parts with lead or equivalent material which is united with the linings of the adjacent glass tubes. This joint covering is indicated by dotted lines 18 in Fig. 2. The next step is to enclose the parts with glass of the same character that is used in making said tubes. To do this, a suitable mold is provided which encloses the exposed conductor and makes a snug fit with the tubes near the ends thereof. The mold comprises two metal parts 19 and 20 each enclosing a half of the glass tubing and united at the bottom by a hinge 21 or other means and at the top by bolting lugs 22. At the top is an opening 23 to receive the molten glass. The ends of the tube and the mold are heated nearly to the fusing temperature of the glass tubes by any known means after which molten glass from a portable furnace is poured into the mold to fill it and encase the conductor ends, the molten glass being fused to the ends of the glass tubes 6. It is desirable to make the covering somewhat larger than the tubes both for reasons of mechanical strength and to insure good insulation. After the joint covering is completed, it is desirable to anneal the glass to free it of internal strains as fully as possible. This may be done by suitably arranged electric heaters supplied with current from some available source or by sending a heavy electric current through the conductor.

After the cable lengths have been united as described, the cable as a whole is lowered into the trench and covered by earth. If the cable has to pass over unsettled earth or under roadways, it may be supported or protected externally by means commonly used for similar purposes.

In the foregoing, the glass enclosure is stated as being tubular. This statement applies to the interior of the enclosure where it is desirable to have the shape correspond to the shape of the conductor. The outer surface may or may not be concentric with respect to the axis. Any excess material will serve to increase the mechanical strength.

If it is desirable to have a definite voltage to earth, for example in a three wire system with the middle wire maintained at ground potential, a thin tape of non-corroding metal may be provided over the glass or the glass may be given a thin coating of metal in any suitable known way. In Fig. 8, such a tape is indicated at 24.

Advantages of my improved construction reside in the fact that the cost of insulation is greatly reduced and no impregnation is required, that the lead sheath commonly used with underground cables is eliminated, also that the glass tubing forms the entire support for the cable. A further advantage resides in the fact that if by accident a glass tube is fractured, it may readily be repaired by grinding away material adjacent the injury and fusing new glass to the tube to take the place of that which has been removed.

Another and outstanding advantage in the use of glass as an insulator for cables resides in its greater thermal conductivity. While values vary with different kinds of glass, the general order of magnitude is twice that of impregnated paper insulation used in cable manufacture. In other words, heat generated in the cable due to the passage of current is much more readily transmitted outwardly. As constructed at present, the paper insulation of cables has to be so thick that only low current densities are permissible whereas with glass, due to its better thermal characteristics, substantially higher current densities may be employed.

Reference has heretofore been made to using copper as the conductor but other materials may be employed, for example, aluminum which has been found useful for overhead lines. Aluminum has only had a limited use for high tension underground cable. One of the reasons being that to carry current with the same $I^2R$ loss as copper, it has to have a diameter approximately one and one-quarter times larger. Such an increase in diameter increases the amount of insulation required and also requires a larger lead sheath. As paper and lead are both relatively expensive, the increased cost of such cable rarely is not economically warranted. However, by using cheap glass for the insulation as heretofore described, aluminum conductors in spite of their increased diameter may be used and the total cost of a cable so made will be substantially less than that of the ordinary type of paper insulated cable for high voltage transmission.

I may also use metallic sodium or magnesium as the conducting material although their specific resistance is approximately three times as high as copper. This results, of course, in a substantially larger conductor than copper for the same current carrying capacity. One heretofore considered objection to the use of metallic sodium is its relatively low melting point which led to requiring low current density to keep down the temperature rise. These two circumstances required a large cross section for the conductor which in turn increased the quantity of insulation to cover it and tended to limit the consideration of sodium to conductors for low voltage applications. Even these applications were not made because the small amount of use of sodium kept the price too high. As pointed out above, the increased diameter of the conductor is no longer an objection where glass tubing on account of its low cost is employed. It is thus clear that high voltage cables which are to be buried in the ground and which require great thicknesses of insulation could only be economical with insulation of high quality and extremely low cost. In this embodiment of my invention, as well as in the others, the first consideration is that the wall of the insulator shall be thick enough to effectively insulate the conductor and second that the glass shall be thick enough to form a self-supporting structure.

What I claim as new and desire to secure by Letters Patent of the United States is:

1. A cable comprising lengths of conductors, an independent rigid glass enclosure for each length having a thick wall for insulating the conductor and acting as the support therefor, a metallic lining between each conductor and the wall of its enclosure, joints uniting the ends of adjacent conductor lengths, and a body of glass fused to and uniting the adjacent ends of each pair of glass enclosures which also encloses a conductor joint.

2. A cable comprising lengths of conductors, an independent glass enclosure for each length having a thick wall for insulating the conductor and acting as a support for it, there being a clearance between each conductor and the bore of its enclosure, a metallic lining between each conductor and its enclosure, joints uniting adjacent conductor lengths, metallic means uniting the linings of adjacent conductors and enclosing the joints thereof, and a body of glass fused to the adjacent ends of each pair of glass enclosures which enclose the joints and also said metallic means.

3. An electric cable comprising a bare conductor conveying electric current at such high potentials that corona effect exists, a glass enclosure through which the conductor extends having sufficiently thick walls as to be self supporting and also forming a longitudinally extending support for the conductor, said enclosure being free of any external covering so that it can freely expand with temperature changes, said enclosure being made in relatively short lengths and adapted to be buried in the ground, joints between the lengths comprising glass which is fused to the ends of the adjacent lengths thereby forming a continuous one piece enclosure, said joints also being free of any external covering so that they can freely expand with temperature changes, and a metallic covering for the inner wall of the enclosure with which the conductor is in longitudinal contact along its entire length, said covering acting to prevent corona effect of the conductor from adversely affecting the glass enclosure.

HENRY M. HOBART.